(12) United States Patent
Fischer

(10) Patent No.: US 6,406,057 B1
(45) Date of Patent: Jun. 18, 2002

(54) RESTRAINT MODULE FOR A MOTOR VEHICLE

(75) Inventor: Anton Fischer, Leinweiler (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/743,141

(22) PCT Filed: Jul. 14, 1999

(86) PCT No.: PCT/EP99/04975

§ 371 (c)(1),
(2), (4) Date: Jan. 5, 2001

(87) PCT Pub. No.: WO00/03897

PCT Pub. Date: Jan. 27, 2000

(30) Foreign Application Priority Data

Jul. 16, 1998 (DE) ..................................... 298 12 708 U

(51) Int. Cl.⁷ .............................................. B60R 21/22
(52) U.S. Cl. .................................. 280/730.2; 280/743.2
(58) Field of Search ........................... 280/730.2, 728.2, 280/749, 730.1, 743.2

(56) References Cited

U.S. PATENT DOCUMENTS

| | | | |
|---|---|---|---|
| 3,687,485 A | | 8/1972 | Campbell |
| 5,462,308 A | * | 10/1995 | Seki et al. ............... 280/730.2 |
| 5,752,713 A | * | 5/1998 | Matsuura et al. ........ 280/730.1 |
| 5,788,270 A | * | 8/1998 | Håland et al. .............. 280/729 |
| 5,865,462 A | * | 2/1999 | Robins et al. ........... 280/730.2 |
| 5,924,723 A | * | 7/1999 | Brantman et al. ....... 280/730.2 |

FOREIGN PATENT DOCUMENTS

| | | |
|---|---|---|
| DE | 4137749 | 5/1993 |
| DE | 19519297 | 7/1995 |
| DE | 4337656 | 11/1995 |
| DE | 29615485 | 2/1997 |
| DE | 29716573 | 5/1998 |
| DE | 197 04 051 A1 * | 8/1998 |
| EP | 0 642 955 A1 * | 3/1995 |
| FR | 2142464 | 1/1973 |
| WO | WO 95/12504 * | 5/1995 |

* cited by examiner

*Primary Examiner*—Lanna Mai
*Assistant Examiner*—Ruth Ilan
(74) *Attorney, Agent, or Firm*—Tarolli, Sundheim, Covell, Tummino & Szabo L.L.P.

(57) ABSTRACT

A restraint module for a motor vehicle, comprising a compressed gas source (10) and an elongated side-impact gas bag (14) being in flow connection therewith, the side-impact gas bag (14) being translatable by means of compressed gas from a collapsed condition arranged in an ejection channel (16) into a deployed condition in which one longitudinal rim (18) of the gas bag (14) freely extends in the interior of the motor vehicle, each of both ends (20, 26) of this longitudinal rim (18) of the gas bag (14) being connectable to a vehicle-fixed tensioning point (24, 32), and a tensioning device (30) being provided cooperating with one of the ends of the longitudinal rim (18), is characterized in that the tensioning device (30) is arranged on the ejection channel (16) and is connected to said end (26) of the longitudinal rim (18) via a traction means (28) which is deflected at a vehicle-fixed point (32).

8 Claims, 3 Drawing Sheets

RESTRAINT MODULE FOR A MOTOR VEHICLE

The invention relates to a restraint module for a motor vehicle, comprising a compressed gas source and an elongated side-impact gas bag being in flow connection therewith, said side-impact gas bag being translatable by means of compressed gas from a collapsed condition arranged in an ejection channel into a deployed condition in which one longitudinal rim of the gas bag freely extends in the interior of the motor vehicle, each of both ends of this longitudinal rim of the gas bag being connectable to a vehicle-fixed tensioning point, and a tensioning device being provided cooperating with one of the ends of the longitudinal rim.

One such restraint module is known from the German Utility Model 297 16 573. The tensioning device serves to maintain the lower longitudinal rim of the gas bag, freely extending in the interior of the motor vehicle, in a tensioned condition, when the gas bag is deployed. This ensures that in the case of a side impact the gas bag continues to offer protection even when the compressed gas has partly escaped from the gas bag, for instance, due to a previous collision or in vehicle toppling which may result in multiple contact between the vehicle occupant and the gas bag.

In the case of the restraint module known from the utility model as cited above the tensioning device consists of a tension spring arranged between one of the ends of the longitudinal rim of the gas bag and a tensioning point on the vehicle. The drawback in this design is the low freedom of design as regards configuring the tensioning device since only little space is available at the intended mounting location, and, in addition, the risk of injury posed by this relatively heavy component being arranged in the interior of vehicle in a region in which the danger exists of the vehicle occupant being impinged thereby in a side-impact situation.

The invention provides a restraint module of the kind as cited above which, on the one hand, offers greater freedom of design in configuring the tensioning device and, on the other, eliminates the risk of injury possibly posed by the tensioning device. In accordance with the invention it is provided for in a restraint module of the kind as cited above, that the tensioning device is arranged on the ejection channel and is connected to the end of the longitudinal rim via a traction means which is deflected at a vehicle-fixed point. The tensioning device is thus arranged in a region which is located protected and not accessible behind the roof lining of the vehicle. In this region any suitable tensioning device may be arranged to then act on the gas bag via the traction means and tension the gas bag when required. An additional advantage of the configuration in accordance with the invention consists in that the compressed gas acting in the ejection channel for deploying the gas bag may be advantageously used to activate the tensioning device, thus making a separate device for activating the tensioning device no longer necessary.

Advantageous aspects of the invention read from the sub-claims.

The invention will now be described with reference to two preferred embodiments as illustrated in the enclosed drawings in which.

Figure 1:
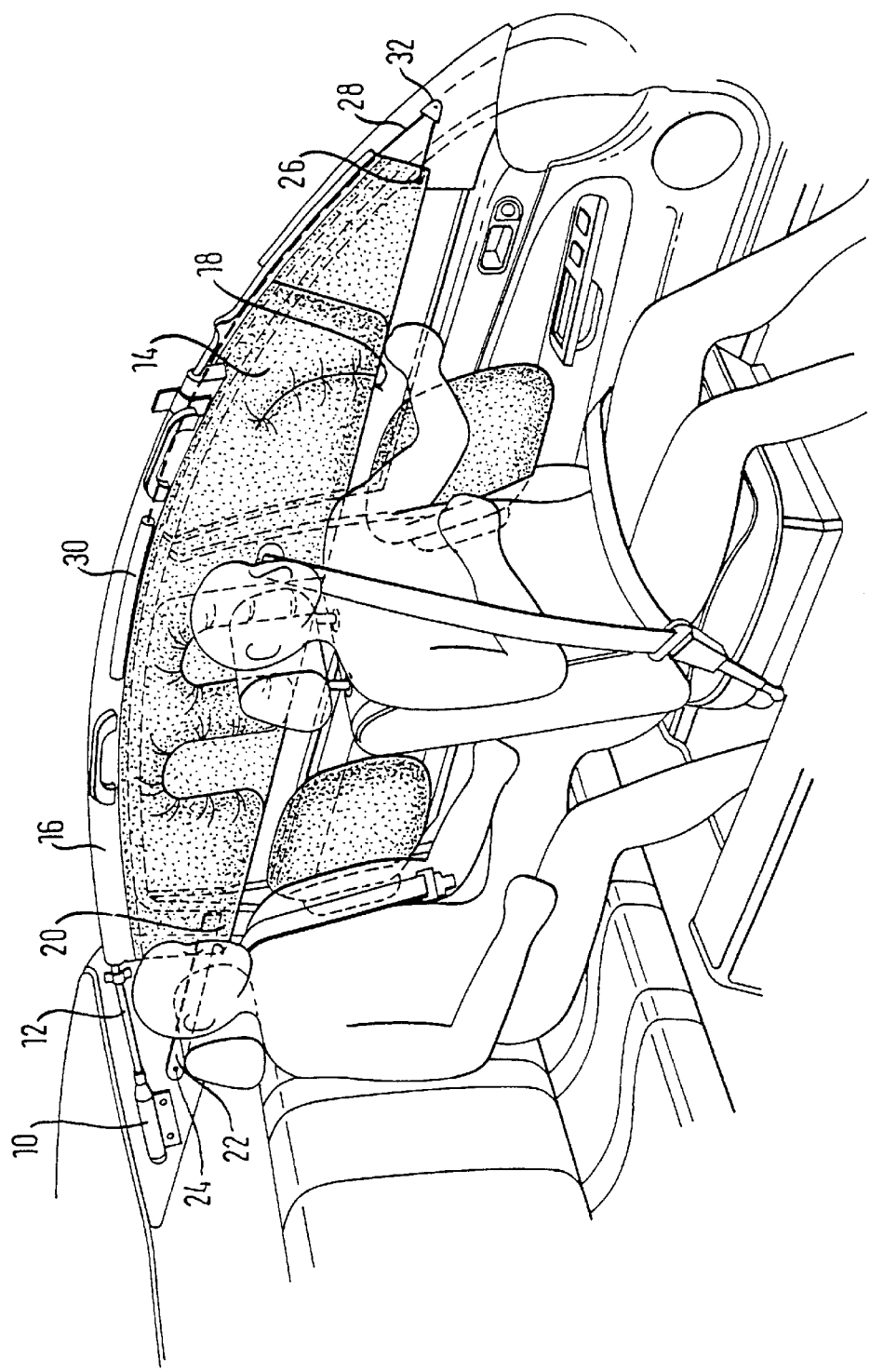
FIG. 1 is a schematic perspective view of a restraint module in accordance with the invention applied in a vehicle.

Referring now to FIG. 1 there is illustrated a restraint module in accordance with the invention. This consists of a compressed gas source 10 being in flow connection with a gas bag 14 via a communicating tube 12, the gas bag in its nonactivated collapsed condition being arranged in an ejection channel 16. Following activation of the compressed gas source 10 the gas bag is deployed so that it is located along a side structure of a vehicle in the condition as shown in FIG. 1. In this condition a longitudinal rim 18 of the gas bag freely extends in the interior of the vehicle. Engaging one end of this longitudinal rim 18, namely at the rear end 20, is a tensioning strap 22 which is connected to a tensioning point 24 on the vehicle body. Engaging the front end 26 of the longitudinal rim 18 of the gas bag is a traction means 28 which is connected to a tensioning device 30. The tensioning device 30 is arranged on the ejection channel 16 roughly in the middle of the latter. In the region of the A-pillar of the vehicle a deflection point 32 is provided which deflects the traction means 28 so that a tensile force oriented forwards relative to the vehicle may be applied to the front end 26 of the gas bag.

Figure 2:
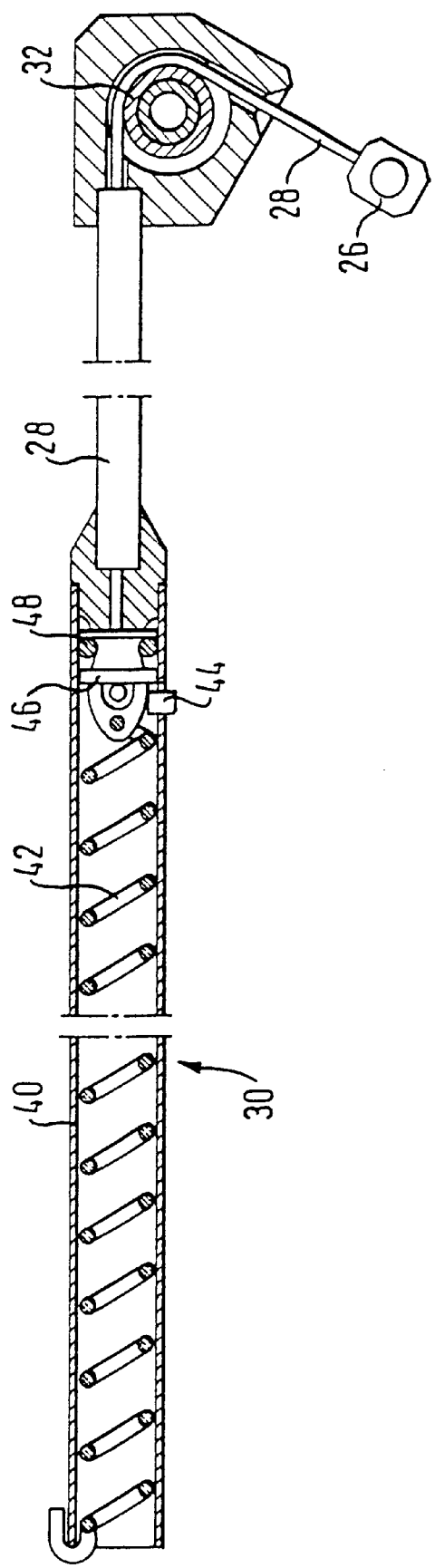
FIG. 2 is a schematic longitudinal section of a tensioning device with a traction means which may be used in conjunction with a restraint module in accordance with a first embodiment.

Referring now to FIG. 2 there is illustrated in detail the tensioning device in accordance with a first embodiment. The tensioning device 30 consists of a hollow cylinder 40 in which a tension spring 42 may be maintained in a pretensioned condition by means of a blocking element 44. Arranged between the tension spring 42 and the traction means, which in this case is configured for example as a Bowden cable, is a cone 46 as a return stop, a blocking ring 48 being provided on the cone.

When the blocking element 44 is translated from its blocking position as shown in FIG. 2 into a released position, the tension spring 42 is able to contract, a force forwardly impinging the front end 26 of the gas bag then being exerted via the traction means 28. The return movement in the sense of an elongation of the tension spring 42 is prevented by means of the cone 46 and the blocking ring 48 which on a return movement wedges between the cone and the inner wall of the hollow cylinder 40.

Figure 3:
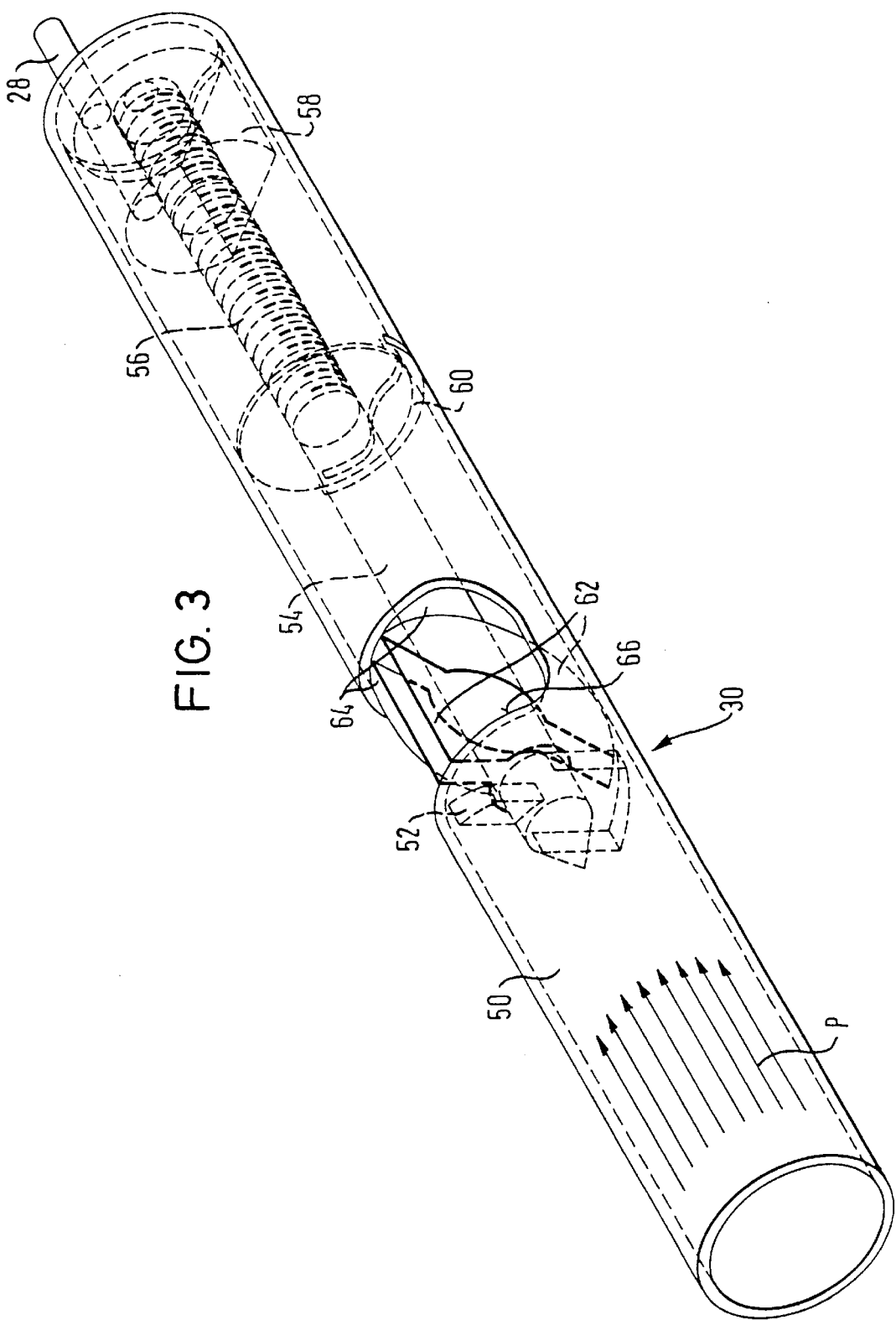
FIG. 3 is a schematic perspective view of a tensioning device which may be used in conjunction with a restraint module in accordance with a second embodiment.

The blocking element 44 may be translated from its blocking position into a released position by any suitable mechanism. A mechanism operated by compressed gas is particularly suitable when the compressed gas source 10 furnishing a compressed gas for deploying the gas bag 14 activates the tensioning device 30. Such a mechanism may be, for example, a small actuating piston in a hollow cylinder being in flow connection with the inner space of the ejection channel 16., Referring now to FIG. 3 there is illustrated a tensioning device in accordance with a second embodiment of the invention. In this case, the tensioning device consists of a hollow cylinder 50, in the inner space of which a turbine wheel 52 is mounted on a shaft 54 comprising a movement thread 56. Arranged on the movement thread 56 is a nut 58 to which the traction means 28 is secured. The shaft 54 is mounted in a mounting disk 60 as well as a mount 62. Downstream of the turbine wheel 52 a gas guidance upsweep 64 is arranged by means of which the compressed gas impelled by the turbine wheel may be directed out of the hollow cylinder 50, a gas exit port 66 being provided for this purpose.

When the compressed gas source 10 is activated a portion of the compressed gas made available thereby (indicated by the arrows P) is directed by a flow connection into the interior of the hollow cylinder 50 and causes the turbine wheel 52 to rotate. In this way the nut 58, is screwed further down the movement thread 56 so that the traction means 28 is drawn into the hollow cylinder 50 and thus produces a tractive effort at the front end 26 of the gas bag.

What is claimed is:

1. A restraint module for a motor vehicle, comprising a compressed gas source (10) and an elongated side-impact gas bag (14) being in flow connection therewith, said side-impact gas bag (14) being translatable by means of compressed gas from a collapsed condition arranged in an ejection channel (16) into a deployed condition in which one longitudinal rim (18) of the gas bag (14) freely extends in the interior of the motor vehicle, each of both ends (20, 26) of this longitudinal rim (18) of the gas bag (14) being connectable to a respective vehicle-fixed tensioning point (24, 32), and a tensioning device (30) being provided cooperating with one of the ends of the longitudinal rim (18), characterized in that said tensioning device (30) is arranged on said ejection channel (16) and is connected to said one end (26) of said longitudinal rim (18) via a traction means (28) which is deflected at one of the vehicle-fixed points.

2. The restraint module as set forth in claim 1, characterized in that said tensioning device (30) is activatable by said compressed gas.

3. The restraint module as set forth in claim 1, characterized in that said traction means is a Bowden cable (28).

4. The restraint module as set forth in claim 1, characterized in that said tensioning device (30) comprises a tension spring (42) maintained in a pretensioned condition by a blocking element (44) which by means of said compressed gas may be translated from a blocking position in which said tension spring (42) is maintained pretensioned, into a released position in which said tension spring (42) is released.

5. The restraint module as set forth in claim 4, characterized in that between said tension spring (42) and said traction means (28) a return stop (46, 48) is arranged.

6. The restraint module as set forth in claim 5, characterized in that said tension spring (42) is arranged in a hollow cylinder (40), that said return stop comprises a cone (46) and that on said cone a blocking ring (48) is arranged such that said blocking ring wedges between the wall of said hollow cylinder (40) and said cone (46) on movement of said cone (46) in the direction of an elongation of said tension spring (42).

7. The restraint module as set forth in claims 1, characterized in that said tensioning device comprises a turbine wheel (52) coupled to a movement screw (56) and that arranged on said movement screw (56) is a nut (58) to which said traction means (28) is connected.

8. The restraint module as set forth in claim 7, characterized in that said turbine wheel (52) is arranged in a hollow cylinder (50) which is in flow connection with said compressed gas source and that said hollow cylinder (50) comprises an exit conduit (62, 66) for said compressed gas flowing through said turbine wheel (52).

\* \* \* \* \*